(12) United States Patent
Clark et al.

(10) Patent No.: US 10,546,005 B2
(45) Date of Patent: *Jan. 28, 2020

(54) PERSPECTIVE DATA ANALYSIS AND MANAGEMENT

(71) Applicant: International Business Machines Corporation, Armonk, NY (US)

(72) Inventors: Adam T. Clark, Mantorville, MN (US); Jeffrey K. Huebert, Byron, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,492

(22) Filed: Apr. 17, 2019

(65) Prior Publication Data

US 2019/0243850 A1     Aug. 8, 2019

Related U.S. Application Data

(63) Continuation of application No. 14/495,088, filed on Sep. 24, 2014, now Pat. No. 10,318,566.

(51) Int. Cl.
| | | |
|---|---|---|
| *G06F 17/28* | (2006.01) | |
| *G06F 17/27* | (2006.01) | |
| *G06F 17/30* | (2006.01) | |
| *G06F 16/33* | (2019.01) | |
| *G06F 16/35* | (2019.01) | |

(52) U.S. Cl.
CPC .......... *G06F 16/3344* (2019.01); *G06F 16/35* (2019.01); *G06F 17/271* (2013.01); *G06F 17/2785* (2013.01)

(58) Field of Classification Search
CPC .... G06F 17/28; G06F 17/271; G06F 17/2785; G06F 17/30684; G06F 17/30705
USPC ............................................................ 704/9
See application file for complete search history.

(56) References Cited

U.S. PATENT DOCUMENTS

| | | | |
|---|---|---|---|
| 8,386,335 B1 | 2/2013 | Cohen | |
| 8,386,336 B1 | 2/2013 | Fox et al. | |
| 9,129,027 B1* | 9/2015 | Hamedi | G06F 16/9535 |
| 9,792,330 B1* | 10/2017 | Hawkins | G06F 16/24578 |
| 10,042,913 B2 | 8/2018 | Clark et al. | |
| 10,055,478 B2 | 8/2018 | Clark et al. | |

(Continued)

OTHER PUBLICATIONS

Clark et al., "Perspective Data Analysis and Management," U.S. Appl. No. 14/495,061, filed Sep. 24, 2014.

(Continued)

*Primary Examiner* — Richemond Dorvil
*Assistant Examiner* — Rodrigo A Chavez
(74) *Attorney, Agent, or Firm* — Peter Edwards (57) ABSTRACT

A system and computer implemented method for managing perspective data is disclosed. The method may include collecting a first lot of perspective data for an item. The method may include introducing a variant feature to the item to constitute a modified item. The method may include collecting a second lot of perspective data for the modified item. The method may also include evaluating the first and second lots of perspective data to ascertain a sentiment fluctuation based on information relevant to the variant feature.

13 Claims, 5 Drawing Sheets

(56) References Cited

U.S. PATENT DOCUMENTS

| | | | |
|---|---|---|---|
| 10,318,566 B2* | 6/2019 | Clark | G06F 16/3344 |
| 2009/0282019 A1 | 11/2009 | Galitsky et al. | |
| 2010/0205663 A1 | 8/2010 | Ward et al. | |
| 2010/0306192 A1 | 12/2010 | Kapur et al. | |
| 2012/0245923 A1* | 9/2012 | Brun | G06F 17/2735 |
| | | | 704/9 |
| 2012/0254060 A1* | 10/2012 | Choudhary | G06Q 30/00 |
| | | | 705/347 |
| 2013/0013603 A1 | 1/2013 | Parker et al. | |
| 2013/0073336 A1 | 3/2013 | Heath | |
| 2013/0080266 A1 | 3/2013 | Molyneux et al. | |
| 2013/0218914 A1 | 8/2013 | Stavrianou et al. | |
| 2013/0311485 A1* | 11/2013 | Khan | G06F 17/2785 |
| | | | 707/748 |
| 2014/0040288 A1* | 2/2014 | Galitsky | G06F 17/271 |
| | | | 707/755 |
| 2014/0075004 A1 | 3/2014 | Van Dusen et al. | |
| 2014/0180788 A1 | 6/2014 | George et al. | |
| 2014/0351079 A1* | 11/2014 | Dong | G06Q 30/0631 |
| | | | 705/26.7 |
| 2015/0332157 A1 | 11/2015 | Baughman et al. | |
| 2016/0085745 A1 | 3/2016 | Clark et al. | |

OTHER PUBLICATIONS

Clark et al., "Perspective Data Analysis and Management," U.S. Appl. No. 14/671,208, filed Mar. 27, 2015.
Clark et al., "Perspective Data Analysis and Management," U.S. Appl. No. 14/495,088, filed Sep. 24, 2014.
Clark et al., "Perspective Data Analysis and Management," U.S. Appl. No. 14/671,279, filed Mar. 27, 2015.
Stavrianou et al., "Opinion and Suggestion Analysis for Expert Recommendations," Proceedings of the 13th conference of the European Chapter of the Association for Computational Linguistics, pp. 61-69, Avignon, France, Apr. 23-27, 2012, Copyright 2012 Association for Computational Linguistics.
List of IBM Patents or Patent Applications Treated as Related, dated Apr. 16, 2019, 2 pages.

* cited by examiner

PERSPECTIVE DATA ANALYSIS AND MANAGEMENT

BACKGROUND

The present disclosure relates to computer systems, and more specifically, managing perspective data.

The amount of data available on the Internet and other communication networks is growing rapidly. Perspective data, such as reviews, editorials, commentaries, social media and the like are examples of content available to users. As the amount of available information increases, the need for managing perspective data may also increase.

SUMMARY

Aspects of the present disclosure, in certain embodiments, are directed toward a system and method for managing perspective data. In certain embodiments, the method may include collecting a first lot of perspective data for an item. In certain embodiments, the method may include introducing a variant feature to the item to constitute a modified item. In certain embodiments, the method may include collecting a second lot of perspective data for the modified item. In certain embodiments, the method may include evaluating the first and second lots of perspective data to ascertain a sentiment fluctuation based on information relevant to the variant feature.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to various embodiments of a system and method for managing perspective data. The perspective data may, for example, include a first set of reviews. More particular aspects relate to analyzing semantic and syntactic content of a first set of reviews using a natural language processing technique. The method may include identifying a variant feature of an item having a first set of reviews. Based on the variant feature, the method may include grouping the first set of reviews into a first group and a second group. The method may include determining a first set of relevancy scores for the first group and a second set of relevancy scores for the second group. The method may also include establishing, using at least one of the first and second relevancy scores, a second set of reviews configured to be a subset of the first set of reviews.

In recent years, the increased availability and access to large amounts of content via the Internet, social media, and other networks have resulted in an increase in the need for organizing and evaluating that content. Reviews are one form in which opinions, commentaries, and perspectives regarding the quality or merit of an item can be expressed. Aspects of the present disclosure relate to the recognition that over time, updates, revisions, and other sorts of changes to items may render particular reviews less relevant to certain audiences of readers. For example, an item such as a product may receive a mid-cycle design change to a component that may impact the quality and reviews regarding the item. Similarly, a change in hotel or restaurant service may influence the subsequent reviews and opinions written by patrons. Accordingly, aspects of the present disclosure are directed toward identifying these variations (e.g., variant features) of an item, and using them to manage and organize the reviews for the item. These item variations (e.g., variant features) may take one of a number of forms depending on the nature of the item, including supplier changes, component changes, management/staff changes, renovations, menu changes, and the like. Aspects of the present disclosure may be associated with benefits including review organization, content relevance, time saving, and efficiency.

Aspects of the present disclosure relate to various embodiments of a system and method for managing perspective data. In certain embodiments, the perspective data may include a first set of reviews. More particular aspects relate to analyzing semantic and syntactic content of the first set of reviews using a natural language processing technique. The method and system may work on a number of devices and operating systems. Aspects of the present disclosure, in certain embodiments, include identifying a variant feature of an item having a first set of reviews. The variant feature may be configured to change with respect to a predetermined fixed criterion. In certain embodiments, identifying the variant feature of an item having a first set of reviews may include parsing the first set of reviews. The first set of reviews may be parsed by a natural language processing technique configured to analyze semantic and syntactic content. In response to parsing the first set of reviews, the method may also include determining a set of shared characteristics of the set of reviews. The method may also include selecting a first shared characteristic of the first set of reviews as the variant feature. In certain embodiments, selecting the first shared characteristic as the variant feature may include determining, based on semantic information analyzed by the natural language processing technique, that the first shared characteristic has a pertinence value greater than a pertinence threshold.

Aspects of the present disclosure include grouping, based on the variant feature, the first set of reviews into a first group and a second group. In certain embodiments, grouping the reviews may include sorting, into the first group, reviews of the first set of reviews that are coupled with a first variable element of the variable feature. The first variable element of the variable feature may correspond to the fixed criterion. In certain embodiments, grouping the reviews may include sorting, into the second group, reviews of the first set of reviews that are coupled with a second variable element of the variable feature. The second variable element of the variable feature may correspond to the fixed criterion.

Aspects of the present disclosure, in certain embodiments, are directed toward determining a first set of relevancy scores for the first group and a second set of relevancy scores for the second group. In certain embodiments, determining the relevancy scores may include parsing the first group using a natural language processing technique configured to analyze semantic and syntactic content. The method may also include calculating, based on syntactic content, semantic content, and metadata for the first group, the first set of relevancy scores. The method may also include assigning the first set of relevancy scores to the first group. In certain embodiments, calculating the first set of relevance scores may include weighting the first set of relevance scores based on a triggering event linked to the variant feature.

Aspects of the present disclosure, in certain embodiments, are directed toward establishing, using at least one of the first and second relevancy scores, a second set of reviews configured to be a subset of the first set of reviews. In certain embodiments, establishing the second set of reviews may include determining that the first set of relevancy scores of the first group is greater than a first relevancy threshold, and that the second set of relevancy scores of the second group is lower than the first relevancy threshold. In response to determining that the second set of relevancy scores of the second group is lower than the first relevancy threshold, the method may include filtering the first set of reviews to remove the second group. Further aspects of the present disclosure are directed toward generating a chronological representation for the first set of reviews in relation to the variant feature, the first variable element, and the second variable element.

Figure 1:
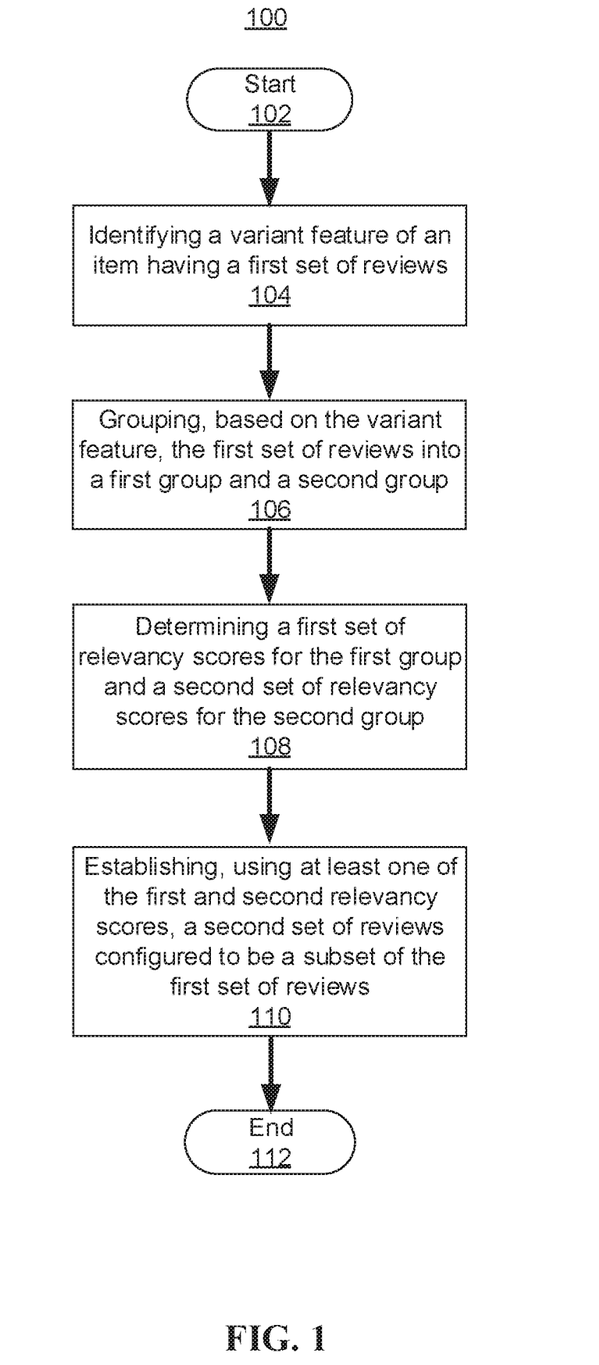
FIG. 1 is a flowchart illustrating a method for managing a set of perspective data, according to embodiments.

Turning now to the figures, FIG. 1 is a flowchart illustrating a method 100 for analyzing and managing a set of item reviews, consistent with embodiments of the present disclosure. Aspects of FIG. 1 are directed toward establishing a second set of reviews using relevancy scores and a variant feature of a first set of reviews. The method 100 may begin at block 102 and end at block 112. Consistent with various embodiments, the method 100 can include an identifying block 104, a grouping block 106, a determining block 108, and an establishing block 110.

Consistent with various embodiments, at block 101 the method 100 may include identifying a variant feature of an item having a first set of perspective data. The item may include a product (hardware or software), component, service, commodity, material, article, software, technology, technical data, process, material, establishment, organization, building, location, or the like. As an example, in certain embodiments, the item may be a consumer product such as a smart phone, a television, a car, a bicycle, or the like. As an additional example, the item may be a restaurant, hotel, college, retail store, or internet shopping portal. As described herein, the item may have a first set of perspective data. In certain embodiments, the first set of perspective data may include a first set of reviews. The first set of reviews may be evaluations, assessments, or commentaries, editorials, opinion pieces, social media, or other content for the item that assesses the relative quality or merit of the item.

The first set of reviews may include reviews of a number of different media formats. For example, the first set of reviews may include reviews in the form of videos, audio files (e.g., podcasts), web site articles, magazine articles, television or radio broadcasts, or the like. In certain embodiments, one or more reviews of the first set of reviews may include a quantitative rating such as a number or letter to indicate the overall merit of the item. In certain embodiments, the first set of reviews may include both user reviews (e.g., reviews written by consumers or customers based on experience with the item) and critic reviews (e.g., reviews written by professional journalists or critics.)

In certain embodiments, the variant feature may be a characteristic or aspect of an item having a first set of reviews. More specifically, the variant feature may be a characteristic of the item that is discussed in one or more reviews of the first set of reviews. In certain embodiments, the variant feature may be configured to change (e.g., vary) with respect to a predetermined, fixed criterion. For example, consider a set of reviews for a television. Many reviews written early after the consumer release of the television may criticize the sound quality of the "Integrated Audio Basic" built-in speakers as low-volume and lacking bass. In response, the manufacturer of the television may revise later models of the same SKU (stock-keeping unit) to have the better quality "Super Audio Experience" built-in speakers. After this change, later reviews may mention that the built-in speakers were excellent, having a full range of sound and volume options. Accordingly, "built-in speakers" could be identified as a variant feature.

Further, in certain embodiments, the variant feature may include two or more variable elements dependent on the predetermined-fixed criterion. For instance, in the previous example, the "Super Audio Experience" built-in speakers may be identified as a first variable element, and the "Integrated Audio Basic" built-in speakers may be identified as a second variable element. As described above, the inclusion of the "Integrated Audio Basic" speakers or the "Super Audio Experience" speakers in one of the televisions is dependent on time (e.g., when the television was manufactured). As an additional example, consider a restaurant with two locations; one in the town of Hill Valley and another in the town of Sunnydale. Reviews for the restaurant may praise the prompt service and excellent staff of the Hill Valley restaurant, while criticizing the slow service and unfriendly staff of the Sunnydale location. Accordingly, the variant feature may be identified as "restaurant service" configured to vary with respect to location. Further, the first variable element may be identified as the Hill Valley location and the second variable element may be identified as the Sunnydale location.

Consistent with various embodiments, the method may include identifying the variant feature of an item having a first set of reviews. In certain embodiments, identifying the variant feature of the item may include using a natural language processing technique to parse the content of the first set of reviews. Parsing the content of the first set of reviews may include analyzing the linguistic content of an article, audio file, or video. In certain embodiments, the natural language processing technique may be a software tool, widget, or other program configured to parse the first set of reviews. In certain embodiments, the natural language processing technique can be configured to analyze a semantic feature and a syntactic feature of the portion of the set of search results and the portion of the search query. The natural language processing technique can be configured to recognize keywords, contextual information, and metadata tags associated with the first set of reviews. In certain embodiments, the natural language processing technique can be configured to analyze summary information, keywords, figure captions, and text descriptions included in first set of reviews, and use syntactic and semantic elements present in this information to determine the variant feature. The syntactic and semantic elements can include information such as word frequency, word meanings, text font, italics, hyperlinks, proper names, noun phrases, parts-of-speech, and the context of surrounding words. Other syntactic and semantic elements are also possible. Additionally, the natural language processing technique may be configured to collect and parse information other than the first set of reviews. For instance, the natural language processing technique may gather data from websites, product specifications, user profiles, social media, and the like.

Based on the analyzed metadata, contextual information, syntactic and semantic elements, and other data, the natural language processing technique can be configured to determine a set of shared characteristics of the first set of reviews. The set of shared characteristics may include keywords or concepts that are mentioned multiple times in the first set of reviews. For instance, the natural language processing technique may determine that the set of shared characteristics are mentioned a number of times greater than a frequency threshold. In certain embodiments, the frequency threshold may be predetermined. In certain embodiments, the frequency threshold may be adjustable based on the subject matter of the first set of reviews, media format of the reviews, or other factor. In certain embodiments, keywords and concepts may not be explicitly mentioned in the set of reviews, but may be inferred based on contextual and semantic information of the first set of reviews. Other methods of determining the set of shared characteristics are also possible.

In response to determining the set of shared characteristics of the set of reviews, the method 100 may include selecting a first shared characteristic from the set of shared characteristics as the variant feature. In certain embodiments, selecting the first shared characteristic from the set of shared characteristics can include determining, based on semantic information analyzed by the natural language processing technique, that the first shared characteristic has a pertinence value greater than a pertinence threshold. Put differently, the method 100 can analyze the contextual meaning (e.g., semantic information) of each shared characteristic of the set of shared characteristics, and choose the shared characteristic that most greatly influenced the sentiment of the review. The pertinence value may, in certain embodiments, be an integer value between 1 and 100. Similarly, the pertinence threshold may be a predetermined pertinence value. A shared characteristic having a pertinence value greater than the pertinence threshold may be selected as the variant feature.

For instance, consider the following example. The set of shared characteristics for a set of reviews for a cell phone may, in certain embodiments, include key words and phrases such as battery life, screen resolution, app availability, call quality, and messaging functions. The natural language processing technique may analyze semantic information and contextual data for each of the key words and phrases of the set of shared characteristics, and determine a pertinence value for each shared characteristic. In certain embodiments, the natural language processing technique may determine that "battery life" is mentioned along with the phrases "notable flaw," "disappointingly short" and "key weakness." Accordingly, in certain embodiments, the method 100 may include assigning a pertinence value of 84 to the shared characteristic of "battery life." Further, in certain embodiments, the method 100 may include determining that the pertinence value of 84 is above the predetermined pertinence threshold of 75. Accordingly, "battery life" may be selected as the variant feature.

Consistent with various embodiments, at block 106 the method 100 may include grouping, based on the variant feature, the first set of reviews into a first group and a second group. Grouping the first set of reviews into the first group and the second group may include organizing the reviews of the first set of reviews based on the variant feature. More specifically, in certain embodiments, grouping the first set of reviews can include sorting reviews that are associated with a first variable element of the variant feature into the first group, and sorting reviews that are associated with a second variable element of the variant feature into the second group. In certain embodiments, the natural language processing technique may be configured to analyze the first set of reviews, and determine whether reviews included in the first set of reviews are more closely related to the first variable element or the second variable element. More specifically, in certain embodiments, the natural language processing technique may perform a frequency analysis for a particular review of the first set of reviews, and determine whether terms or phrases semantically or syntactically related to the first variable element or the second variable element are mentioned with greater frequency. Consider once again the example discussed above in which the variant feature is determined to be "restaurant service," the first variable element is determined to be "Hill Valley" and the second variable element is determined to be "Sunnydale." In certain embodiments, the natural language processing technique may analyze the first set of reviews, and sort reviews that discuss the "Hill Valley" restaurant location into the first group, and sort reviews that discuss the "Sunnydale" restaurant location into the second group. Other methods of grouping the first set of reviews are also possible.

Consistent with various embodiments, at block 108 the method 100 may include determining a set of relevancy scores for a group of the first set of reviews. More specifically, the method 100 can include determining a first set of relevancy scores for the first group of the first set of reviews, and a second set of relevancy scores for the second group of the first set of reviews. In certain embodiments, the method 100 may include determining a relevancy score for each review of a particular group of reviews. In certain embodiments, the method 100 may include determining an overall relevancy score for an entire group of reviews. Generally, the first set of relevancy scores may be one or more numerical values that indicate the relative significance, notability, or quality of a group of reviews. Put differently, the relevancy scores may represent the relevance of the group of reviews with respect to a user. As an example, the first set of relevancy scores may be expressed as an integer between 1 and 100, wherein greater numbers indicate greater relevance (e.g., with respect to a user), while lesser numbers indicate lesser relevance.

In certain embodiments, determining the set of relevancy scores can include parsing a group (e.g., the first or second group) of the first set of reviews. Parsing the group of the first set of reviews can include using a natural language processing technique, as described herein, to analyze semantic content, syntactic content, and metadata of the group. As an example, parsing semantic content may include determining the relative sentiment (e.g., attitude, position, opinion, emotions) of a review based on an analysis of the contextual information, linguistic data, and semantic elements found in the review. As an example, a review that includes words and phrases such as "lacking," "poor," and "unimpressive" may be characterized as having a substantially negative sentiment, while a review that includes words and phrases such as "phenomenal," "above average," and "impressive" may be characterized as having a substantially positive sentiment. In certain embodiments, natural language processing technique may determine a sentiment factor for the review. The sentiment factor may be an integer value that characterizes the overall attitude of the review with respect to the item. For instance, in certain embodiments, the sentiment factor may be an integer value between 1 and 10, wherein lower integers indicate a generally lower (e.g., substantially negative, or unfavorable) sentiment, and higher integers indicate a generally higher (e.g., substantially positive, or favorable) sentiment. In certain embodiments, the variant feature may be determined based on the sentiment factor (e.g., a sentiment factor higher than a sentiment threshold, or a substantial change in sentiment factor).

As an additional example, parsing metadata may include analyzing additional information coupled with a particular review. For instance, in certain embodiments, a quantitative rating coupled with the review (e.g., 8/10, A+, etc.) may also be identified when parsing metadata of the group of reviews, and can be used in determining relevancy scores for the group of reviews. Similarly, a particular product may have a defect or other issue recognized by the manufacturer, and may be tagged to indicate the issue. It may also be determined that an associated date or location of an item may affect the potential relevance of the item to a user (e.g., recent reviews for a product have identified a problem not present in older models).

Based on the parsed semantic content, syntactic content, and metadata of the group, the method 100 can include calculating the set of relevancy scores. Calculating the set of relevancy scores may include using an algorithm or other technique configured to weight the parsed semantic content, syntactic content, and metadata, and compute the set of relevancy scores using the calculated weights. As an example, for a group including three reviews, the algorithm may compute a set of relevancy scores of 67, 49, 88, and 91 respectively. In response to calculating the relevancy scores, the method 100 may include assigning the set of relevancy scores to the group of reviews. Assigning the set of relevancy scores to the group of reviews may include designating a particular relevancy score as corresponding to a corresponding review of the group of reviews. For example, the method 100 may assign the relevancy score 67 to a first review, the relevancy score 49 to a second review, the relevancy score 88 to a third review, and the relevancy score 91 for a fourth review. Other methods of calculating the set of relevancy scores are also possible.

Consistent with various embodiments, at block 110 the method 100 may include establishing, using at least one of the calculated relevancy scores, a second set of reviews configured to be a subset of the first set of reviews. Establishing the second set of reviews may include organizing, creating, promoting, or indicating a portion of reviews (e.g., the second set) of reviews such that they are distinct from the first set of reviews. Generally, the second set of reviews may be a portion of the first set of reviews that are relevant, notable, or significant (e.g., with respect to a user). More specifically, establishing the second set of reviews may include determining that one or more reviews of the first set of reviews have relevancy scores greater than or equal to a first relevancy threshold, and that one or more reviews of the first set of reviews have relevancy scores less than the first relevancy threshold. Accordingly, the method 100 may include filtering the first set of reviews to remove the reviews that have relevancy scores below the relevancy threshold. As an example, in certain embodiments, the relevance threshold may be 75. Consider once again the example above, wherein a first review has a relevancy score of 67, a second review has a relevancy score of 49, a third review has a relevancy score of 88, and a fourth review has a relevancy score of 91. In certain embodiments, the first and second reviews may be filtered from the set of reviews. In certain embodiments, in response to determining that particular reviews of the first set of reviews have relevancy values below the relevancy threshold, the method may include tagging those reviews with a marker, flag, or other indicator to represent that those reviews are of lesser relevance. Other methods of establishing the second set of reviews are also possible.

In certain embodiments, in response to establishing the second set of reviews, the method 100 may be configured to provide the second set of reviews to a user. Providing the second set of reviews to a user may be done in one of a number of ways. In certain embodiments, a review report containing the second set of reviews may be provided to the user via electronic mail, smartphone alert, web page notification, or the like. In certain embodiments, a chart, graph, timeline or other visual representation including the second set of reviews is also possible.

Figure 2:
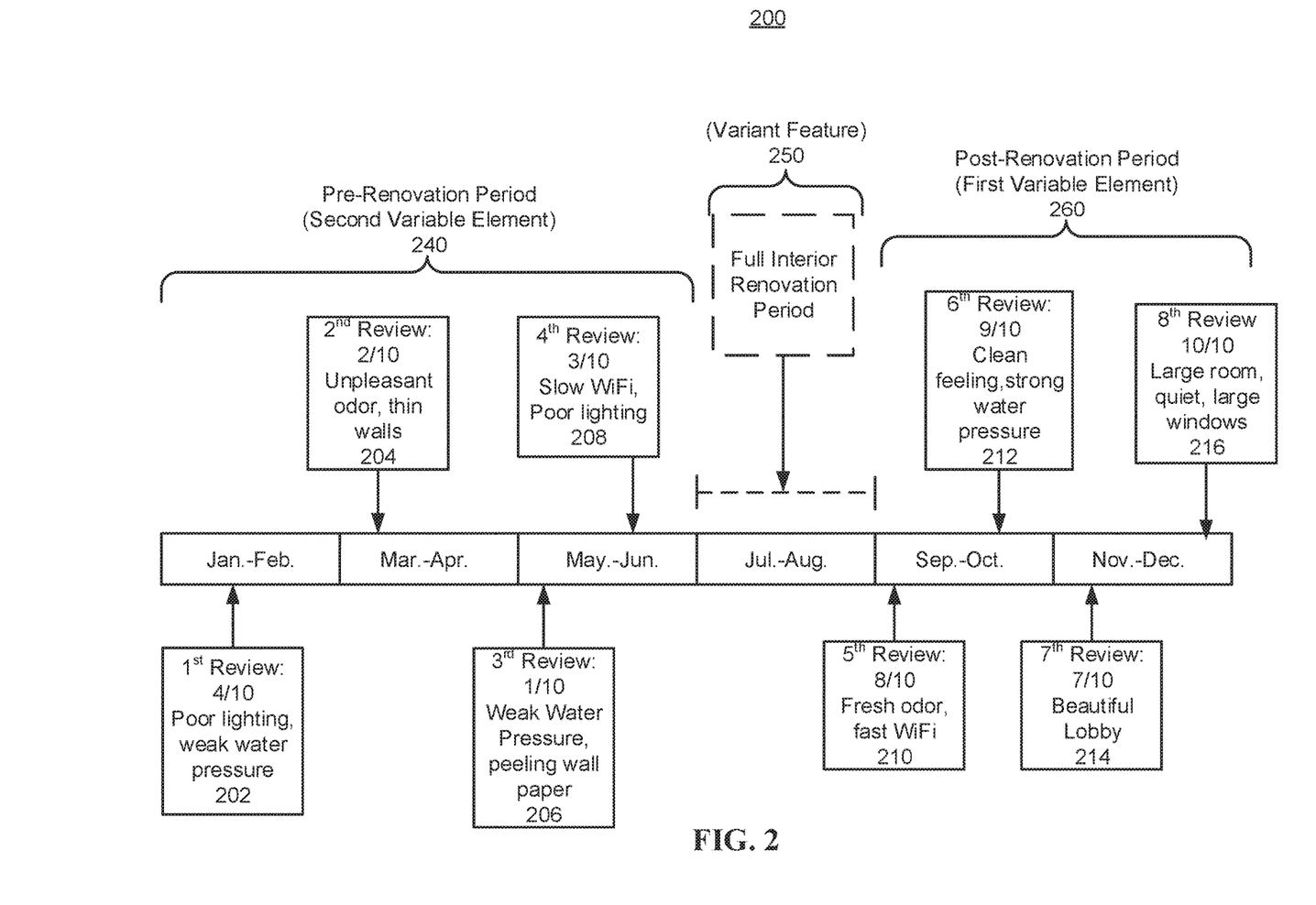
FIG. 2 is an illustration of an example implementation of a method for managing perspective data, according to embodiments.

FIG. 2 is an illustration of an example implementation of a method for managing reviews, consistent with various embodiments. Aspects of FIG. 2 are directed toward a review timeline 200 for managing reviews for an item. More specifically, FIG. 2 depicts a review timeline for organizing and displaying reviews for a hotel. As shown in FIG. 2, the review timeline 200 can include a first review 202, a second review 204, a third review 206, a fourth review 208, a fifth review 210, a sixth review 212, a seventh review 214, an eighth review 216, a pre-renovation period (second variable element) 240, a full interior renovation period (variant feature) 250, and a post-renovation period (first variable element) 260.

Aspects of the present disclosure, in certain embodiments, are directed toward generating a chronological representation for a set of reviews with respect to a variant feature, a first variable element, and a second variable element. Accordingly, in certain embodiments, the chronological representation may be a review timeline 200, as shown in FIG. 2. The review timeline may display a time interval annotated with one or more reviews. In certain embodiments, the reviews may be placed along the timeline based on the date that they were written. In certain embodiments, the natural language processing technique described herein may be configured to select and provide reviews that have relevancy scores above a second relevancy threshold.

Consider the following example. A hotel may receive generally poor reviews over a six month period between January and June. The reviews may criticize the hotel's lack of cleanliness, antiquated interior, and deteriorated condition. For example, a first review 202 may rate the hotel a 4/10, citing poor lighting and weak water pressure, and a second review 204 may rate the hotel a 2/10, discussing an unpleasant smell and thin walls. Similarly, a third review 206 may give the hotel a 1/10 rating based on peeling wall paper and weak water pressure, and a fourth review 208 may rate the hotel a 3/10 because of slow internet and poor lighting. Over a two month period between July and August, the hotel may undergo a full interior renovation. After the renovation, the overall sentiment of the reviews may become more positive. For instance, a fifth review may rate the hotel an 8/10, praising the fast internet and fresh smell, and a sixth review 212 may give the hotel a 9/10 rating based on a "clean feeling" and strong water pressure. Additionally, a seventh review 214 may rate the hotel a 7/10 for reasons including a "beautiful lobby," and an eighth review 216 may give the hotel a 10/10 rating, speaking highly of the large room, windows, and lack of noise.

Consistent with various embodiments, aspects of the present disclosure are directed toward identifying a variant feature for the hotel using the set of reviews. As discussed herein, identifying the variant feature may include using a natural language processing technique to parse the set of reviews and evaluate the sentiment of the set of reviews, as well as identify shared characteristics. In certain embodiments, the set of shared characteristics may include specific words or phrases that are mentioned in multiple reviews of the set of reviews, such as "water pressure." For example, the set of shared characteristics may include "water pressure" and "odor." In certain embodiments, the set of shared characteristics may be inferred by the natural language processing technique based on the semantic and syntactic content of the reviews. For example, the natural language processing technique may determine that "interior condition" is a general theme discussed in the set of reviews, and identify it as a shared characteristic.

Further, the natural language processing technique may analyze the sentiment of the set of reviews, and determine that the sentiment regarding the shared characteristic of "interior condition" has changed from substantially negative (e.g., sentiment factors below 5) to substantially positive (e.g., sentiment factors 5 or greater) based on early reviews containing terms such as "poor" and "unpleasant," while later reviews contain terms such as "fresh," "clean," and "beautiful." Further, in certain embodiments, the natural language processing technique may be configured to collect data from sources other than the set of reviews, such as the hotel websites, travel guides, and the like. For instance, in the present example, the natural language processing technique may determine based on information on the website of the hotel, that an interior renovation was conducted between July and August. The natural language processing technique may correlate the interior renovation with the determined change in sentiment regarding the "interior condition," and determine the full interior renovation as the variant feature 250. Similarly, the natural language processing technique may determine the pre-renovation period as the second variable element 240, and the post renovation period as the first variable element 260.

As described herein, based on the variant feature 250, the first variable element 260, and the second variable element 240, aspects of the present disclosure are directed toward grouping the first set of reviews into a first group and a second group. Grouping the first set of reviews may include sorting reviews associated with the first variable element into a first group, and reviews associated with the second variable element into a second group. Accordingly, in the present example, the first, second, third, and fourth reviews that were written in the pre-renovation period (e.g., the second variable element) may be sorted into the second group, while the fifth, sixth, seventh, and eighth reviews written in the post-renovation period (e.g., the first variable element) may be sorted into the first group.

Aspects of the present disclosure are directed toward determining a first set of relevancy scores for the first group, and a second set of relevancy scores for the second group. As described herein, the relevancy scores may be calculated by the natural language processing technique using semantic content, syntactic content, and metadata for both groups of reviews. For example, the relevancy scores may be computed based on individual ratings or scores (e.g., metadata) of one or more reviews in a particular group. For instance, in the present example, the first group may be assigned a relevancy score of 8.5 (e.g., the mean of the reviews included in the first group) and the second group may be assigned a relevancy score of 2.5 (e.g., the mean of the reviews included in the second group). In certain embodiments, each review of a particular group may be assigned a relevancy score. Other methods of calculating the relevancy scores are also possible.

Aspects of the present disclosure are directed toward establishing a second set of reviews using at least one of the first and second sets of relevancy scores. Establishing the second set of reviews may be done in one of a number of ways. For example, in the present example, reviews included in a group with a relevancy score greater than a relevancy threshold of 7.5 (e.g., the fifth, sixth, seventh, and eighth reviews) may be provided in a "Suggested Reviews" category (e.g., on a travel website or the like.) Similarly, in certain embodiments, a review timeline 200 may be displayed, and reviews in the second set of reviews may be highlighted or starred to notify users. Other methods of establishing the second set of reviews are also possible.

Figure 3:
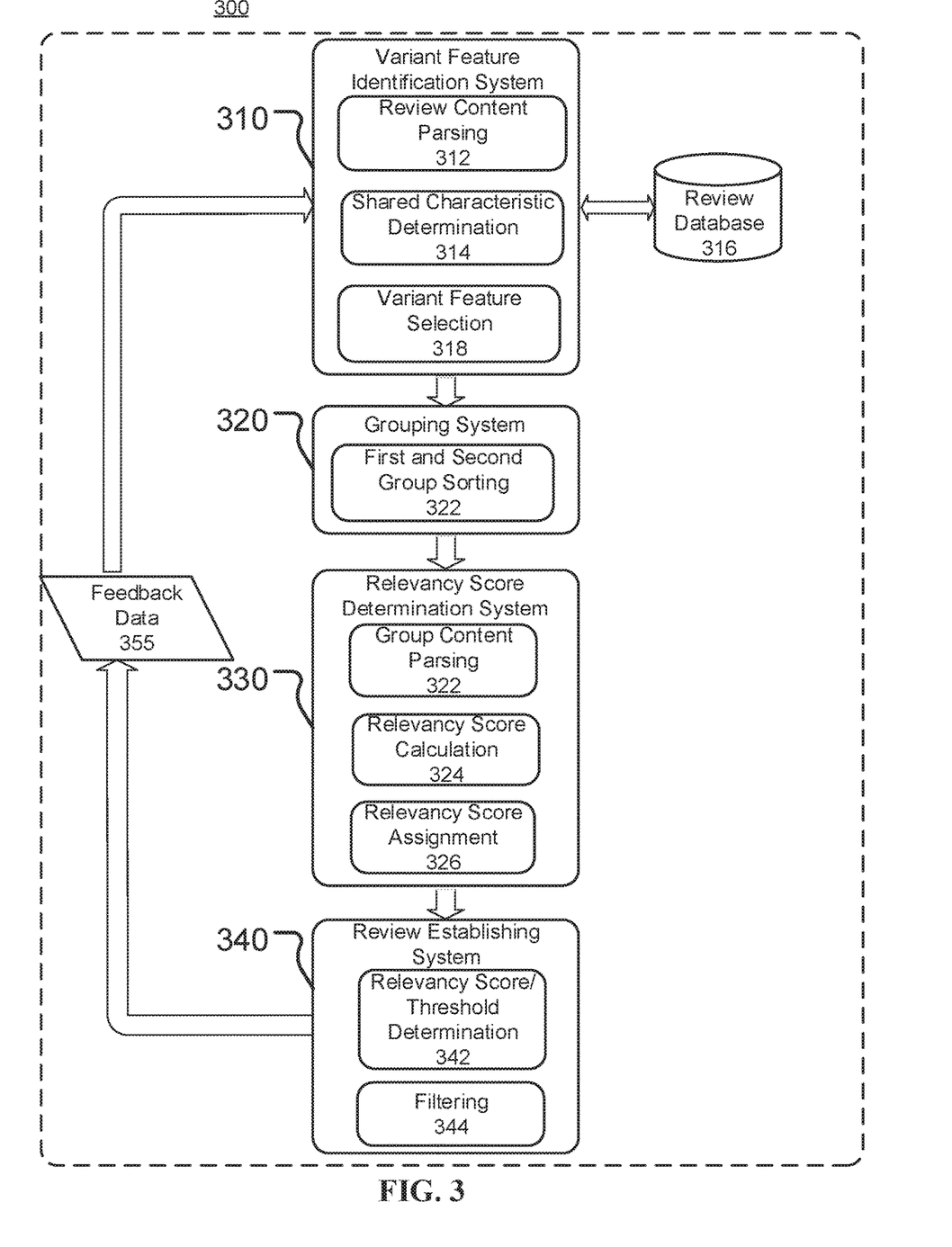
FIG. 3 is a diagram illustrating an example system architecture for managing perspective data, according to embodiments.

FIG. 3 is a diagram illustrating an example system architecture 300 for managing reviews, consistent with embodiments of the present disclosure. Aspects of FIG. 3 are directed toward grouping and scoring a first set of reviews for an item using an identified variant feature, and establishing a second set of reviews. As shown in FIG. 3, in certain embodiments, the example system architecture 300 can include a variant feature identification system 310, a review content parsing module 312, a shared characteristic determination module 314, a review database 316, a variant feature selection module 318, a grouping system 320, a first and second group sorting module 322, a relevancy score determination system 330, a group content parsing module 322, a relevancy score calculation module 324, a relevancy score assignment module 326, a review establishing system 340, a relevancy score/threshold determination module 342, a filtering module 344, and feedback data 355.

Consistent with various embodiments, the variant feature identification system 310 of FIG. 3 may substantially correspond with identifying block 104 of FIG. 1. The review content parsing module 312 may be configured to use a natural language processing technique to analyze semantic and syntactic content of a first set of reviews. The first set of reviews may, in certain embodiments, be stored on a review database 316 accessible to the variant feature identification system 310. In response to parsing the first set of reviews, the shared characteristic determination module 314 may be configured to determine a set of shared characteristics of the first set of reviews. The variant feature selection module 318 may be configured to select a first shared characteristic as the variant feature. In certain embodiments, the first shared characteristic may be selected as the variant feature based on a pertinence value greater than a pertinence threshold.

As described herein, in certain embodiments, the natural language processing technique may be configured to evaluate the sentiment of the first set of reviews, and determine a sentiment factor for one or more reviews of the first set of reviews. Accordingly, in certain embodiments, the variant feature may be determined based on the sentiment of the first set of reviews. For example, in certain embodiments, the natural language processing technique may determine that there is a change in the sentiment factor of the first set of reviews in response to a triggering event. The change in the sentiment factor may, for instance, be an increase or decrease in the sentiment factor greater than a sentiment change threshold. Accordingly, the natural language processing technique may, in certain embodiments, select the triggering event as the variant feature.

Consistent with various embodiments, the grouping system 320 may substantially correspond with grouping block 106 of FIG. 1. The grouping system 320 may be configured to group the first set of reviews into a first group and a second group based on the variant feature. More specifically, the first and second group sorting module 322 may be configured to sort reviews associated with a first variable element of the variant feature into the first group, and sort reviews associated with a second variable element of the variable feature into the second group. In certain embodiments, the first variable element of the variant feature may be associated with a sentiment factor greater than (or equal to) a sentiment threshold, and the second variable element may be associated with a sentiment factor less than a sentiment threshold. The sentiment threshold may be a predetermined sentiment factor. For example, in certain embodiments, the sentiment threshold may be 5. Accordingly, the first variable element may be associated with a sentiment factor greater than or equal to 5 (e.g., generally positive reviews), while the second variable element is associated with a sentiment factor less than 5 (e.g., generally negative reviews).

Consistent with various embodiments, the relevancy score determination system 330 may substantially correspond with the determining block 108 of FIG. 1. The group content parsing module 322 may be configured to parse, using the natural language processing technique, semantic and syntactic content of a group (e.g., the first and second group). Based on syntactic content, syntactic content, and metadata for the group, the relevancy score calculation module 324 may be configured to calculate a set of relevancy scores for the group. In response to calculating the set of relevancy scores, the relevancy score assignment module 326 may assign the relevancy scores to the group.

Consistent with various embodiments, the review establishing system 340 may substantially correspond to the establishing block 110 of FIG. 1. The relevancy score/threshold determination module 342 may be configured to determine that the first set of relevancy scores of the first group is greater than a first relevancy threshold, and that the second set of relevancy scores of the second group is lower than the first relevancy threshold. Accordingly, the filtering module 344 can be configured to filter the first set of reviews to remove the second group. In certain embodiments, the review establishing system may be configured to transmit feedback data 355 to the variant feature identification system 310. The feedback data 355 may contain information regarding the relevancy scores, second set of reviews, first and second groups, and first and second variable elements that may allow the variant feature identification system 310 to refine the process of variant feature identification.

Figure 4:
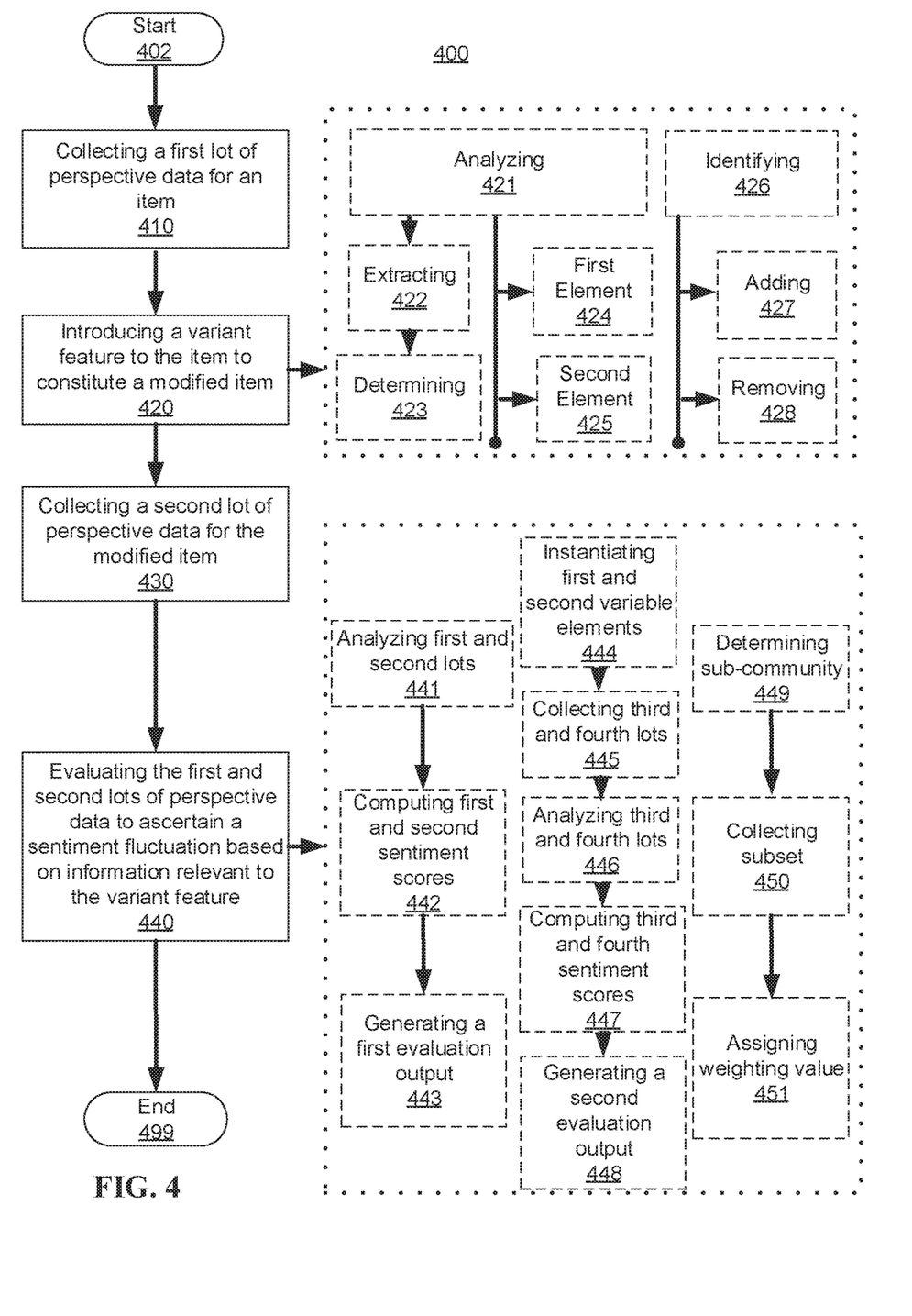
FIG. 4 is a flowchart illustrating a method for managing perspective data, according to embodiments.

FIG. 4 is a flowchart illustrating a method 400 for analyzing and managing a set of item reviews, consistent with embodiments of the present disclosure. Aspects of FIG. 4 are directed toward evaluating a first and a second lot of perspective data to ascertain a sentiment fluctuation. The method 400 may begin at block 402 and end at block 499. Consistent with various embodiments, the method 400 can include a first collecting block 410, an introducing block 420, a second collecting block 430, and an evaluating block 440.

Aspects of FIG. 4, in certain embodiments, are directed toward introducing a variant feature to an item, collecting perspective data from before and after the introduction of the variant feature, and evaluating the perspective data to ascertain a sentiment fluctuation based on information relevant to the variant feature. In certain embodiments, at block 410 the method 400 may include collecting a first lot of perspective data for an item. The first lot of perspective data may include reviews, commentary, editorials, social media data, opinion pieces, and other content that assesses the relative quality or merit of the item.

At block 420, the method 400 may include introducing a variant feature to the item to constitute a modified item. In certain embodiments, introducing the variant feature to the item may be based on the first lot of perspective data. For example, in certain embodiments, at block 421 the method 400 may include analyzing the first lot of perspective data using a natural language processing technique configured to parse semantic and syntactic content. In response to analyzing the first lot of perspective data, the method 400 may include extracting, at block 422, revision candidate data for the item. The revision candidate data for the item may be information including a list of potential aspects or characteristics of the item that may be revised, improved, or updated. Based on the revision candidate data for the item, at block 423 the method 400 can include determining a variant feature for the item. The variant feature may, in certain embodiments, be introduced to revise, improve, or update the item.

In certain embodiments, the variant feature may be introduced to the item in response to a triggering event. For example, in certain embodiments, in response to analyzing the first lot of perspective data for the item at block 421, at block 424 the method 400 can include determining that a first element of the first lot of perspective data for the item is characterized by a sentiment score above a sentiment threshold. Similarly, at block 425, the method 400 can include determining, in response to analyzing the first lot of perspective data at block 421, that a second element of the first lot of perspective data for the item is characterized by a sentiment score below a sentiment threshold. As described herein, aspects of the present disclosure are directed toward analyzing the semantic and syntactic content of perspective data to determine a relative sentiment (e.g., based on the tone, diction, quantitative rating, and other characteristics). Accordingly, the sentiment score may be an integer value between 0 and 100, wherein lower integers indicate a relatively unfavorable (e.g., negative) sentiment, and higher integers indicate a relatively favorable (e.g., positive sentiment). The first element may, for instance, be a component of the item that is associated with a substantially high sentiment score, but it may be desirable to revise the first element for cost/benefit reasons. Similarly, the second element may be a component of the item that is associated with a substantially low sentiment score, and be desirable to revise in order to improve the quality of the item.

As described herein, introducing the variant feature may be performed in one of a number of ways. For example, at block 426, the method 400 may include identifying, based on the collected revision candidate data for the item, a first component absent from the item. Accordingly, introducing the variant feature may, at block 427, include adding the first component to the item. For instance, in certain embodiments, the item may be a tablet computer. Initially, the tablet computer may not be equipped with a physical keyboard. Adding the first component may include supplementing future models of the tablet computer with a physical keyboard. In certain embodiments, at block 426, the method 400 may include identifying, based on the collected revision candidate data for the item, a second component included in the item. Introducing the variant feature may, at block 428, include removing the second component from the item. For instance, the item may be a restaurant, and the second component may be a lutefisk dish available on the menu. Accordingly, removing the second component may include removing the lutefisk dish from the menu.

At block 430, in certain embodiments, the method 400 may include collecting a second lot of perspective data for the modified item. As described herein, the second lot of perspective data may include reviews, commentary, editorials, social media data, opinion pieces, and other content that assesses the relative quality or merit of the modified item.

At block 440, in certain embodiments, the method 400 may include evaluating the first and second lots of perspective data to ascertain a sentiment fluctuation based on information relevant to the variant feature. The sentiment fluctuation may be a relative change in the opinion, tone, attitude, or feeling expressed by the perspective data with respect to the item. In certain embodiments, the sentiment fluctuation may be brought on by the introduction of the variant feature. For example, as described herein, the rating of a review for a hotel may increase from 3 stars to 4 stars in response to a change in the management at the hotel.

In certain embodiments, at block 441, evaluating the first and second lots of perspective data may include analyzing the first and second lots of perspective data using a natural language processing technique. Based on semantic and syntactic content of the first and second lots of perspective data, at block 422 the method 400 may include computing a first sentiment score for the first lot of perspective data and a second sentiment score for the second lot of perspective data. As described herein, the first and second sentiment scores may be computed based on diction, tone, metadata, and other content associated with the first and second lot of perspective data. At block 443, the method 400 may include comparing the first sentiment score with the second sentiment score, and generating a first evaluation output. The first evaluation output may include an assessment of the relative effect of the variant feature. For instance, the evaluation output may rate the effectiveness of the variant feature based on the first and second sentiment score. For example, in a situation where the second sentiment score is significantly greater (e.g., beyond a threshold value) than the first sentiment score, the variant feature may be evaluated to be substantially effective. In a situation where the second sentiment score is not significantly greater (e.g., not beyond a threshold value) or below the first sentiment score, the variant feature may not be evaluated as being substantially effective.

In certain embodiments, as described herein the variant feature may include a first variable element and a second variable element. The first and second variable elements may correspond to a predetermined, fixed criterion (e.g., time, location). At block 444, the method 400 may include instantiating the first variable element and the second variable element. More specifically, the method 400 can include instantiating the first variable element for a first item and a second variable element for a second item. At block 445, the method 400 can include collecting a third lot of perspective data for the first item and a fourth lot of perspective data for the second item. At block 446, the method can include using a natural language processing technique to analyze the third and fourth lots of perspective data. Based on semantic and syntactic content of the third and fourth lots of perspective data, at block 447 the method 400 may include computing a third sentiment score for the third lot of perspective data and a fourth sentiment score for the fourth lot of perspective data. At block 448, the method 400 can include generating a second evaluation output including an assessment of the relative effect of the first variable element and the second variable element.

Consistent with various embodiments, as described herein, the method 400 can include collecting the first lot of perspective data for the item from a first community of users, and collecting the second lot of perspective data for the modified item from a second community of users. At block 449, the method 400 can include determining, by comparing the first community of users with the second community of users, a sub-community of users. In certain embodiments, the sub-community of users may be included in both the first community of users and the second community of users. At block 450, the method 400 can include collecting a subset of perspective data from the sub-community of users. At block 451, the method 400 can include assigning a weighting value to the subset of perspective data. In certain embodiments, the weighting value may be an integer indicating a level of relevance or significance of the subset of perspective data.

Figure 5:
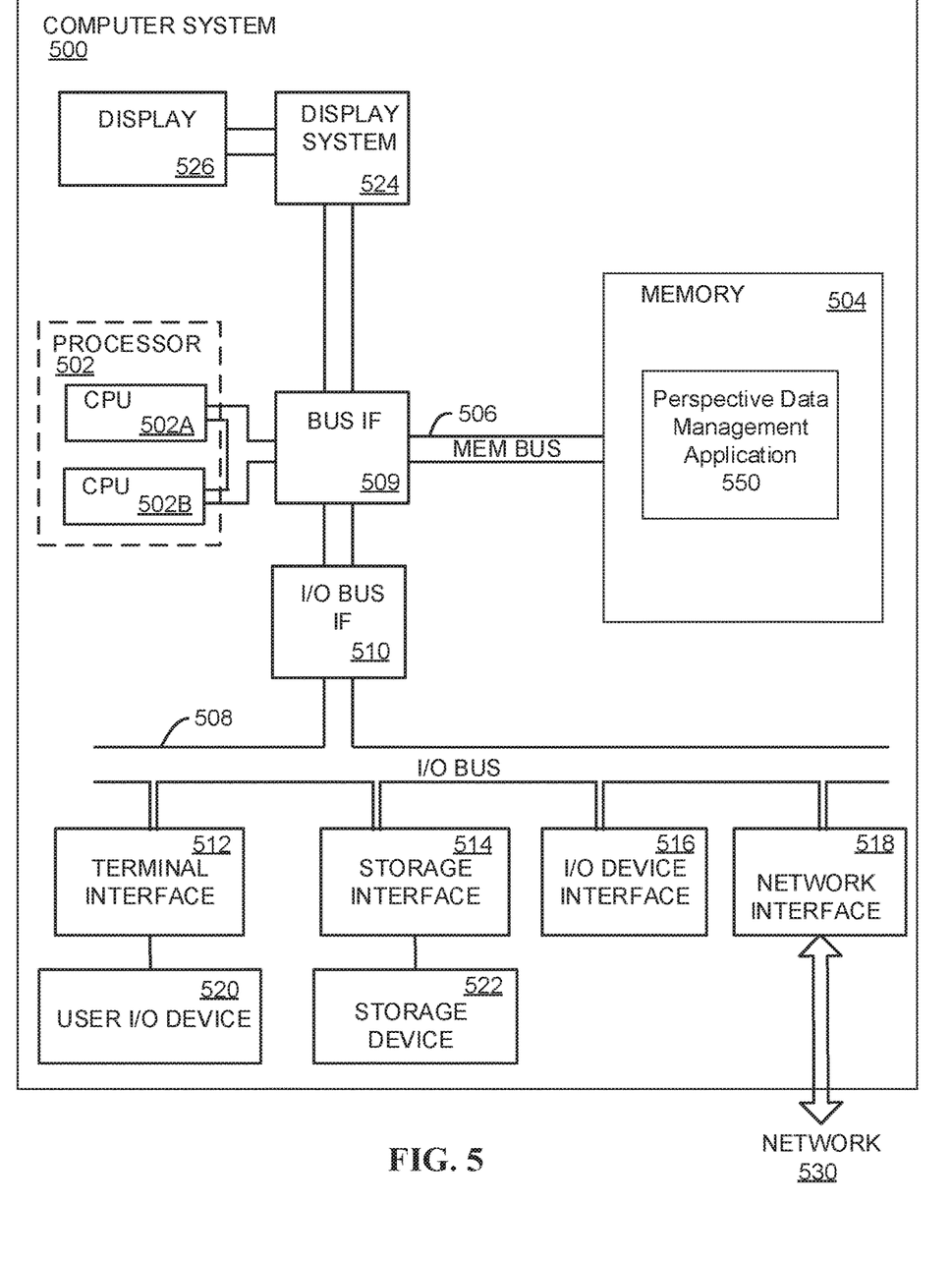
FIG. 5 depicts a high-level block diagram of a computer system for implementing various embodiments of the present disclosure, according to embodiments.

FIG. 5 depicts a high-level block diagram of a computer system 500 for implementing various embodiments. The mechanisms and apparatus of the various embodiments disclosed herein apply equally to any appropriate computing system. The major components of the computer system 500 include one or more processors 502, a memory 504, a terminal interface 512, a storage interface 514, an I/O (Input/Output) device interface 516, and a network interface 518, all of which are communicatively coupled, directly or indirectly, for inter-component communication via a memory bus 506, an I/O bus 508, bus interface unit 509, and an I/O bus interface unit 510.

The computer system 500 may contain one or more general-purpose programmable central processing units (CPUs) 502A and 502B, herein generically referred to as the processor 502. In embodiments, the computer system 500 may contain multiple processors; however, in certain embodiments, the computer system 500 may alternatively be a single CPU system. Each processor 502 executes instructions stored in the memory 504 and may include one or more levels of on-board cache.

In embodiments, the memory 504 may include a random-access semiconductor memory, storage device, or storage medium (either volatile or non-volatile) for storing or encoding data and programs. In certain embodiments, the memory 504 represents the entire virtual memory of the computer system 500, and may also include the virtual memory of other computer systems coupled to the computer system 500 or connected via a network. The memory 504 can be conceptually viewed as a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 504 may store all or a portion of the various programs, modules and data structures for processing data transfers as discussed herein. For instance, the memory 504 can store a perspective data management application 550. In embodiments, the perspective data management application 550 may include instructions or statements that execute on the processor 502 or instructions or statements that are interpreted by instructions or statements that execute on the processor 502 to carry out the functions as further described below. In certain embodiments, the perspective data management application 550 is implemented in hardware via semiconductor devices, chips, logical gates, circuits, circuit cards, and/or other physical hardware devices in lieu of, or in addition to, a processor-based system. In embodiments, the perspective data management application 550 may include data in addition to instructions or statements.

The computer system 500 may include a bus interface unit 509 to handle communications among the processor 502, the memory 504, a display system 524, and the I/O bus interface unit 510. The I/O bus interface unit 510 may be coupled with the I/O bus 508 for transferring data to and from the various I/O units. The I/O bus interface unit 510 communicates with multiple I/O interface units 512, 514, 516, and 518, which are also known as I/O processors (IOPs) or I/O adapters (IOAs), through the I/O bus 508. The display system 524 may include a display controller, a display memory, or both. The display controller may provide video, audio, or both types of data to a display device 526. The display memory may be a dedicated memory for buffering video data. The display system 524 may be coupled with a display device 526, such as a standalone display screen, computer monitor, television, or a tablet or handheld device display. In one embodiment, the display device 526 may include one or more speakers for rendering audio. Alternatively, one or more speakers for rendering audio may be coupled with an I/O interface unit. In alternate embodiments, one or more of the functions provided by the display system 524 may be on board an integrated circuit that also includes the processor 502. In addition, one or more of the functions provided by the bus interface unit 509 may be on board an integrated circuit that also includes the processor 502.

The I/O interface units support communication with a variety of storage and I/O devices. For example, the terminal interface unit 512 supports the attachment of one or more user I/O devices 520, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 520 and the computer system 500, and may receive output data via the user output devices. For example, a user interface may be presented via the user I/O device 520, such as displayed on a display device, played via a speaker, or printed via a printer.

The storage interface 514 supports the attachment of one or more disk drives or direct access storage devices 522 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 522 may be implemented via any type of secondary storage device. The contents of the memory 504, or any portion thereof, may be stored to and retrieved from the storage device 522 as needed. The I/O device interface 516 provides an interface to any of various other I/O devices or devices of other types, such as printers or fax machines. The network interface 518 provides one or more communication paths from the computer system 500 to other digital devices and computer systems; these communication paths may include, e.g., one or more networks 530.

Although the computer system 500 shown in FIG. 5 illustrates a particular bus structure providing a direct communication path among the processors 502, the memory 504, the bus interface 509, the display system 524, and the I/O bus interface unit 510, in alternative embodiments the computer system 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 510 and the I/O bus 508 are shown as single respective units, the computer system 500 may, in fact, contain multiple I/O bus interface units 510 and/or multiple I/O buses 508. While multiple I/O interface units are shown, which separate the I/O bus 508 from various communications paths running to the various I/O devices, in other embodiments, some or all of the I/O devices are connected directly to one or more system I/O buses.

In various embodiments, the computer system 500 is a multi-user mainframe computer system, a single-user system, or a server computer or similar device that has little or no direct user interface, but receives requests from other computer systems (clients). In other embodiments, the computer system 500 may be implemented as a desktop computer, portable computer, laptop or notebook computer, tablet computer, pocket computer, telephone, smart phone, or any other suitable type of electronic device.

FIG. 5 depicts several major components of the computer system 500. Individual components, however, may have greater complexity than represented in FIG. 5, components other than or in addition to those shown in FIG. 5 may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different manners, including using various computer applications, routines, components, programs, objects, modules, data structures, etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system, having one or more computer processors, for managing reviews with respect to a change to an item, the system configured to:
    identify a variant feature of an item having a first set of reviews, wherein the variant feature is a changed characteristic of the item, and wherein identifying the variant feature comprises:
        parsing the first set of reviews using a natural language processing technique configured to analyze semantic and syntactic content, determining sentiment factors for two or more reviews from the first set of reviews,
evaluating the first set of reviews to identify a change in sentiment factor between the two or more reviews, and
identifying the variant feature based on the change in sentiment factor;
group, based on the variant feature, the first set of reviews into a first group and a second group, wherein grouping the first set of reviews comprises:
analyzing, using natural language processing, the first set of reviews to determine whether reviews included in the first set of reviews are more closely associated with a first variable element of the variant feature or a second variable element of the variant feature,
sorting into the first group, based on the analyzing, first reviews of the first set of reviews that are associated with the first variable element of the variant feature, and
sorting into the second group, based on the analyzing, second reviews of the first set of reviews that are associated with the second variable element of the variant feature;
determine a first set of relevancy scores for the first group and a second set of relevancy scores for the second group, wherein a relevancy score is a numerical value indicating a relative significance of a review;
establish, using at least one of the first set of relevancy scores and the second set of relevancy scores, a second set of reviews configured to be a subset of the first set of reviews, wherein the second set of reviews is a subset of the first set of reviews that have the relevancy score greater than a threshold relevancy score; and
provide a visual representation of the second set of reviews to a user.

2. The system of claim 1, wherein evaluating the first set of reviews to identify the change in sentiment factor comprises:
determining the change in the sentiment factor in response to a triggering event, and
wherein identifying the variant feature based on the change in sentiment factor comprises:
selecting the triggering event as the variant feature.

3. The system of claim 1, wherein:
the change in the sentiment factor is an increase in the sentiment factors greater than a sentiment change threshold.

4. The system of claim 1, wherein:
the change in the sentiment factor is a decrease in the sentiment factors greater than a sentiment change threshold.

5. The system of claim 1, wherein the first variable element is associated with a first sentiment factor greater than a sentiment threshold, wherein the sentiment threshold is a predetermined sentiment factor, and the second variable element is associated with a second sentiment factor less than the sentiment threshold.

6. The system of claim 1, wherein the first variable element is associated with a first sentiment factor equal to a sentiment threshold, and the second variable element is associated with a second sentiment factor less than the sentiment threshold.

7. The system of claim 1, wherein the determining whether reviews included in the first set of reviews are more closely associated with a first variable element of the variant feature or a second variable element of the variant feature includes using a frequency analysis to determine whether terms or phrases related to the first variable element or the second variable element are mentioned with greater frequency in the reviews.

8. A computer program product comprising a computer readable storage medium having a computer readable program stored therein, wherein the computer readable program, when executed on a first computing device, causes the first computing device to:
identify a variant feature of an item having a first set of reviews, wherein the variant feature is a changed characteristic of the item, and wherein identifying the variant feature comprises:
parsing the first set of reviews using a natural language processing technique configured to analyze semantic and syntactic content,
determining sentiment factors for two or more reviews from the first set of reviews,
evaluating the first set of reviews to identify a change in sentiment factor between the two or more reviews, and
identifying the variant feature based on the change in sentiment factor;
group, based on the variant feature, the first set of reviews into a first group and a second group, wherein grouping the first set of reviews comprises:
analyzing, using natural language processing, the first set of reviews to determine whether reviews included in the first set of reviews are more closely associated with a first variable element of the variant feature or a second variable element of the variant feature,
sorting into the first group, based on the analyzing, first reviews of the first set of reviews that are associated with the first variable element of the variant feature, and
sorting into the second group, based on the analyzing, second reviews of the first set of reviews that are associated with the second variable element of the variant feature;
determine a first set of relevancy scores for the first group and a second set of relevancy scores for the second group, wherein a relevancy score is a numerical value indicating a relative significance of a review;
establish, using at least one of the first set of relevancy scores and the second set of relevancy scores, a second set of reviews configured to be a subset of the first set of reviews, wherein the second set of reviews is a subset of the first set of reviews that have the relevancy score greater than a threshold relevancy score; and
provide a visual representation of the second set of reviews to a user.

9. The computer program product of claim 8, wherein evaluating the first set of reviews to identify the change in sentiment factor comprises:
determining the change in the sentiment factor in response to a triggering event, and
wherein identifying the variant feature based on the change in sentiment factor comprises:
selecting the triggering event as the variant feature.

10. The computer program product of claim 8, wherein the change in the sentiment factor is an increase in the sentiment factors greater than a sentiment change threshold.

11. The computer program product of claim 8, wherein the change in the sentiment factor is a decrease in the sentiment factors greater than a sentiment change threshold.

12. The computer program product of claim 8, wherein the first variable element is associated with a first sentiment factor greater than a sentiment threshold, wherein the sentiment threshold is a predetermined sentiment factor, and the second variable element is associated with a second sentiment factor less than the sentiment threshold.

13. The computer program product of claim 8, wherein the first variable element is associated with a first sentiment factor equal to a sentiment threshold, and the second variable element is associated with a second sentiment factor less than the sentiment threshold.

* * * * *